United States Patent [19]
Marcum et al.

[11] Patent Number: 5,480,593
[45] Date of Patent: Jan. 2, 1996

[54] SUBTERRANEAN AIR LIFT DIFFUSER ASSEMBLY

[75] Inventors: Thomas J. Marcum, Larkspur; Douglas L. Meurer, Lakewood, both of Colo.

[73] Assignee: Wilfley Weber, Inc., Denver, Colo.

[21] Appl. No.: 154,589

[22] Filed: Nov. 18, 1993

[51] Int. Cl.⁶ ..................................................... B01F 3/04
[52] U.S. Cl. ........................................ 261/77; 261/122.2
[58] Field of Search ..................................... 261/77, 122.2

[56] References Cited

U.S. PATENT DOCUMENTS

| | | | |
|---|---|---|---|
| 2,744,065 | 5/1956 | Lacey | 261/122.1 |
| 3,452,966 | 7/1969 | Smolski | 261/77 |
| 3,672,647 | 6/1972 | Murphy et al. | 261/77 |
| 3,790,141 | 2/1974 | Champeau | 261/77 |
| 3,969,446 | 7/1976 | Franklin, Jr. | 261/77 |
| 4,051,035 | 9/1977 | Boschen et al. | 261/77 |
| 4,304,665 | 12/1981 | Hines | 261/77 |
| 4,351,730 | 9/1982 | Bailey et al. | 261/77 |
| 4,549,997 | 10/1985 | Verner et al. | 261/77 |
| 4,690,756 | 9/1987 | Van Ry | 261/123 |
| 4,917,832 | 4/1990 | Marcum et al. | 261/77 |

FOREIGN PATENT DOCUMENTS

| | | | |
|---|---|---|---|
| 2671456 | 7/1992 | France | 261/77 |
| 1301291 | 12/1972 | United Kingdom | 261/77 |

OTHER PUBLICATIONS

PCT Published Application WO94/01212, 20 Jan. 1994 to Baughman.

*Primary Examiner*—Tim R. Miles
*Attorney, Agent, or Firm*—John E. Reilly

[57] ABSTRACT

An air lift diffuser assembly is made up of an air lift tube and a fixed, non-rotating bubble-emitting diffuser horizontally spaced beneath an open end of the air lift tube, the air lift tube and diffuser being releasably positioned in centered relation to a casing which is submerged beneath a body of water and is dimensioned such that the annular space between the air lift tube and casing has a greater cross-sectional area than the cross-sectional area across the tube, and an air supply pipe extends downwardly through the annular space into communication with the diffuser whereby to direct air under pressure into the diffuser which discharges the air in the form of fine bubbles upwardly through the air lift tube where the bubbles become intimately mixed with the water and dispersed in the form of dissolved oxygen over a substantial area of the body of water above the assembly.

13 Claims, 1 Drawing Sheet

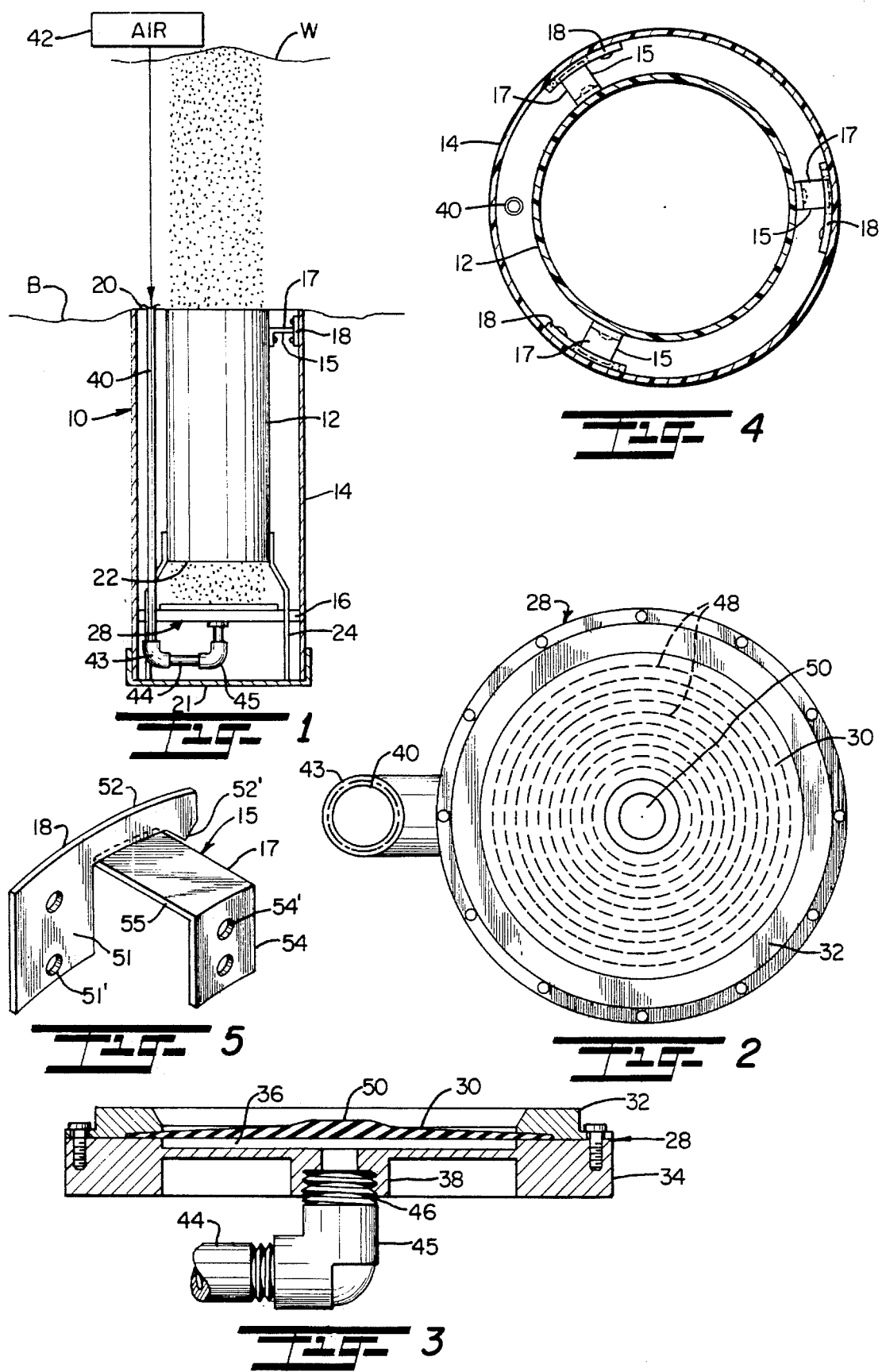

SUBTERRANEAN AIR LIFT DIFFUSER ASSEMBLY

SPECIFICATION

This invention relates to aeration devices; and more particularly relates to a novel and improved subterranean air lift diffuser apparatus for aerating large bodies of water in a highly efficient and reliable manner.

BACKGROUND AND FIELD OF THE INVENTION

Air lift pumps and diffusers are in widespread use in the aeration of large bodies of water, such as, aquaculture ponds employed for the commercial production of large quantities of fish. In U.S. Pat. No. 4,917,832 for AIR LIFT DIFFUSER, assigned to the assignee of this application for patent, there is disclosed what may be generally characterized as a fine bubble air lift diffuser assembly for achieving wide area mixing with high oxygen transfer efficiencies so as to be ideal for waste water, lake management and aquaculture applications. The fine bubble air lift diffuser assembly disclosed in the '832 patent is broadly made up of an air lift tube and a diffuser spaced beneath the lower open end of the tube which diffuser has a fixed, non-rotating bubble-emitting surface, and a source of air under pressure is directed into the bottom of the diffuser to cause the air to be discharged upwardly through the bubble-emitting surface in the form of fine bubbles. The bubbles pass in an upward direction through the interior of the air lift tube so as to become intimately mixed with the water and dispersed in the form of dissolved oxygen over a substantial area of the pond. In order to suspend the air lift diffuser system in a body of water, the air lift tube is mounted in a return tube which in turn is secured to a float in order to maintain the diffuser in a vertical position within the body of water to be aerated.

It has been proposed to employ a diffuser of the type described in the '832 patent within an air lift tube which is anchored in a casing and submerged beneath a body of water. However, the tube is extended the entire length of the casing and in surrounding relation to the diffuser with a limited annular space between the air lift tube and casing for the introduction of water into the diffuser. Moreover, the air lift tube was anchored within the casing and not removable to permit maintenance and repair. In addition, it has been proposed to provide a circulator for the smaller home aquariums in which a vertical tube is embedded in the sand at the bottom of the aquarium and an air tube delivers air under pressure into the base of the vertical tube, as disclosed in U.S. Pat. No. 2,744,065 to Lacey. U.S. Pat. No. 4,549,997 to Verner discloses a device for increasing oxygen concentration in a subsurface stratum of a thermally stratified body of water when the air is introduced both at the lower end and midway up the shell.

U.S. Patent No. 4,690,756 to Van Ry is directed more to a venturi-shaped tube in which the upper end is at the water surface and air as well as water are pumped into the lower end of the tube. However, none of these systems discloses a way of submerging an air diffuser wholly beneath the body of water and particularly an air diffuser of the type described in the '832 patent in order to achieve the desired oxygen transfer. A particular problem encountered in submerging a diffuser assembly beneath the body of water is to achieve the necessary mass flow rate of water downwardly between the diffuser assembly and outer bore or casing for most efficient pumping action as well as to facilitate removal of the diffuser assembly to the surface when necessary for maintenance or repair.

SUMMARY OF INVENTION

It is therefore an object of the present invention to provide for a novel and improved air lift diffuser system for use in aerating large bodies of water.

It is another object of the present invention to provide a novel and improved air lift diffuser assembly in which the entire assembly is submerged beneath the body of water in such a way as to realize greater hydrostatic head and longer contact time between the rising air bubbles and the water to be aerated.

A further object of the present invention is to provide for a novel and improved method and means for positioning an air lift diffuser assembly beneath the body of water to be aerated and in open communication with the water whereby to enhance the conditions for oxygen transer by directing air bubbles upwardly through the full depth of the water.

It is an additional object of the present invention to provide for a novel and improved means for mounting a diffuser assembly beneath a body of water whereby to supply sufficient water capacity for most efficient pumping action and to assure optimum distribution of oxygen as well as the destratification of different temperature layers throughout the body of water.

In accordance with the present invention, there has been devised an air lift diffuser assembly for aerating a body of water which comprises a casing extending downwardly through a vertical bore beneath the body of water, the casing having an upper end and lower closed end, the upper end terminating substantially at the bottom surface of the body of water and air supply means extends downwardly through the casing including a source of air under pressure, an air lift tube disposed in inner spaced concentric relation to the casing, a gas diffuser having a fixed, non-rotating bubble-emitting surface spaced beneath the air lift tube adjacent to the bottom of the casing, the air supply means supplying air under pressure into the diffuser which discharges the air upwardly in the form of fine bubbles to intermix with water drawn downwardly through the annular space surrounding the air lift tube and upwardly through the interior of the tube to intimately mix with the bubbles.

An important feature of the invention is the utilization of an air lift tube which is sized so that the annular space surrounding the air lift tube has a greater cross-sectional area than the cross-sectional area across the tube itself and which together with the spacing between the bottom of the air lift tube and diffuser will induce a high mass rate of flow of water downwardly through the annular space and upwardly through the interior of the air lift tube. Another important feature is utilization of an air supply which is coupled to the air supply source above the body of water. Another important feature is to releasably mount the air lift tube and diffuser within the casing such that it can be easily removed independently of the casing for any necessary repairs or servicing.

The above and other objects of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 1 is a view partially in section of a preferred form of diffuser assembly in accordance with the present invention;

FIG. 2 is an enlarged plan view of the fine bubble diffuser portion of the assembly;

FIG. 3 is a sectional view of the diffuser illustrated in FIG. 2;

FIG. 4 is a cross-sectional view across the upper end of the air lift tube and casing; and FIG. 5 is a perspective view in detail of a preferred form of upper spacer and hold down assembly.

DETAILED DESCRIPTION OF PREFERRED EMBODIMENT

Referring to the drawings, there is shown in FIGS. 1 to 3 a preferred form of diffuser assembly 10 which is submerged beneath a body of water as represented at W so that the uppermost end of the assembly 10 is positioned beneath the bottom surface B of the body of water W. The diffuser assembly 10 comprises an air lift tube 12 suspended in centered relation to an outer casing 14 by upper spacers 15 and lower spacers 16. In order to secure the air lift tube 12 in centered relation to the outer casing 14, the spacers 15 include a plurality of brackets or ears 17 disposed at uniformly spaced circumferential intervals around the outer surface of the lift tube 12 and which are rotatable into locking engagement with a series of correspondingly spaced clips 18 on the inner surface of the casing 14. The casing 14 is of uniform diameter having an upper open end 20 and a lower end which is closed by a bottom plate 21 extending horizontally or transversely across the lower end of the casing 14. The air lift tube 12 is similarly of uniform diameter and somewhat shorter than the casing 14, the tube 12 including a lower terminal end 22 which is spaced above the plate 21 by downwardly divergent legs 24, the legs 24 being arranged at equally spaced circumferential intervals about the lower end of the tube 12.

A fine bubble air diffuser 28 is illustrated in more detail in FIGS. 2 and 3 and includes a flexible perforated diaphragm member 30 of generally circular configuration which is anchored around its periphery by a collar 32 fastened to a base plate 34 with a slight space or air gap 36 defining an air supply chamber beneath the diaphragm 30. A center port 38 is in the form of an internally threaded portion which communicates with the air supply chamber 36.

Air is supplied under pressure to the diffuser assembly by an air supply pipe 40 in communication with a source of air under pressure represented at 42 and which is located above the surface of the water W. The air supply pipe 40 extends vertically through the annular space formed between the air lift tube 12 and casing 14 to a point beneath the diffuser 28 with an elbow 43, nipple 44 and second elbow 45 and nipple 46 completing the connection of the air supply pipe 40 into the center port 38. Preferably, the diffuser 28 is a Stratamix 9 manufactured and sold by Wilfey Weber Company of Denver, Colo. which is characterized by having a series of closely spaced, tiny perforations 48 extending in concentric circles away from a solid center portion 50 of the diaphragm. The air under pressure directed through the port 38 is distributed in an outward radial direction through the chamber 36 to pass uniformly upwardly through the perforations 48 and in an upward direction through the air lift tube 12 as illustrated. The lower edge 22 of the air lift tube is spaced above the diaphragm 30 so that water is free to pass downwardly through the annular space between the air lift tube 12 and casing 14 and to mix intimately with the air bubbles and to advance upwardly in the form of oxygen-rich, fine bubbles into the body of water W. Preferably, the diaphragm or bubble-emitting surface is spaced from the lower end of the air lift tube 12 a distance on the order of ½ to 1½ times the internal diameter of the lower end of the air lift tube. In order to mount the lift tube 12 and diffuser 28 securely in place within the casing 14, the ears or brackets 17 are affixed by suitable fasteners at spaced circumferential intervals to the upper end of the lift tube. In order to releasably mount the air lift tube in position within the casing 14, each of the clips 18 includes a generally rectangular mounting portion 51 provided with spaced openings 51' for suitable fasteners to affix the clips 18 to the upper end of the casing 14. A circumferentially extending arm portion 52 terminates in a free end which is provided with a downwardly projecting tip or pointed end 52'. In turn, each ear 17 includes a generally rectangular mounting plate 54 provided with openings 54' for insertion of standard fasteners, not shown, into aligned openings in the casing lift tube 12, and a ledge 55 projects radially outwardly from the mounting plate 54 a distance corresponding to the annular space between the casing 14 and tube 12. In other words, the ledge 55 will terminate in close proximity to the inner surface of the casing 14 so that when the tube is fully inserted into the casing with the legs 24 resting on the bottom plate 21, the ledges 55 of the bracket 17 will be rotationally aligned directly opposite to the tips or pointed ends 52' of the respective clips 18. By rotating the tube in a counterclockwise direction, as viewed from the top of FIG. 1, each ledge 55 will initially move into engagement with an inclined side surface of one of the tips 52'. The ledge has sufficient resiliency or springiness to yield to the pressure of the tip and bend downwardly slightly in order to clear the tip and move into the space between the tip 52' and the side edge of the mounting plate 51 of each clip. In this way, the tube 12 will become locked in place with respect to the casing 14 against any vertical or rotational shifting movement. When it is necessary or desired to remove the inner diffuser assembly from the outer casing 14, the tube is rotated in a reverse or clockwise direction under sufficient force to cause the ledges 55 to slide past the tips 52' and release the entire inner assembly for removal from the casing. The lower spacers 16 each consist of a spacer block which is affixed by a suitable fastener or fasteners to each of the leg members 24 in order to center the lower end of the diffuser 28 and lift tube 12 within the casing 14. In this way, the lift tube 12 and diffuser 28 as well as the air supply pipe 40 may be lifted out of the casing for maintenance or repair while leaving the casing in place.

Depending upon the size of the pool or body of water W, the mounting tube or casing 14 may vary anywhere from 3' to 11' long. The primary materials of construction both for the lift tube 12 and casing 14 is a PVC pipe-type material although it will be apparent that other types of plastic as well as metal may be employed in the construction of the casing and other elements of the diffuser assembly. Preferably, the area defined by the annular space between the inner lift tube 12 and casing 14 will be equal to or greater than the diameter of the tube 12 so as to enable sufficient draw of water downwardly through the space for mixing with the air under pressure that is discharged through the diaphragm 30 and to maintain maximum oxygen concentration. As the bubbles are discharged upwardly through the exit end of the air lift tube 12, they will be dispersed over a wide area of the body of water in order to assure optimum distribution of oxygen throughout the water as well as to destratify different temperature layers in the body of water. In this relation, the additional depth that the diffuser is able to extend beneath the top surface level of the water affords better oxygen transfer efficiency and substantially more oxygen being transferred to the body of water.

The diffuser assembly of the present invention is particularly adaptable for use in aquaculture operations. Typically, the number of units required for aquaculture purposes is on the order of two to six units per acre. The number of units required for lagoons or basins in waste water treatment operations will vary dependent upon the requirements of the design for the waste water treatment system. In providing a mounting system that places the diffuser assembly below the bottom of a pond, the assembly is out of the way of all aquaculture operations and will not be an obstruction during the harvest period.

It is therefore to be understood that while a preferred embodiment of the invention is herein set forth and described, various modifications and changes may be made therein as well as in the specific construction and composition of materials without departing from the spirit and scope of the present invention as defined by the appended claims and reasonable equivalents thereof.

We claim:

1. In an air lift diffuser assembly for aerating a body of water wherein an air lift assembly comprises a straight air lift tube having an upper open end and a lower open end vertically oriented in predetermined spaced relation to a gas diffuser, said gas diffuser including a fixed, non-rotating bubble-emitting surface spaced beneath said open end of said air lift tube, and air supply means are provided for directing air under pressure upwardly from said gas diffuser through said lower open end for upward advancement through said tube and discharge from said upper open end into said body of water, the improvement comprising:

suspension means for suspending said air lift diffuser assembly in a vertical bore extending beneath said body of water with said upper open end of said air lift tube in open communication with said body of water, said suspension means including a casing disposed in outer surrounding relation to said air lift tube and said gas diffuser and complementary locking elements at spaced circumferential intervals between said upper open end of said air lift tube and said casing whereby said lift tube is rotatable into and out of locking engagement with said casing, said casing having an upper end terminating substantially at a bottom surface of said body of water and a lower end terminating beneath said gas diffuser, and an unrestricted annular space between said air lift tube and said casing, said space being of a cross-sectional area greater than the cross-sectional area across said tube.

2. In an air lift diffuser assembly according to claim 1, said suspension means including means releasably connecting said air lift tube to said casing.

3. In an air lift diffuser assembly according to claim 1, said suspension means including circumferentially spaced, vertically extending leg members diverging downwardly from said air lift tube, and spacer blocks interposed between said leg members and said casing.

4. In an air lift diffuser assembly according to claim 1, said suspension means including a plurality of clips at spaced circumferential intervals on one of said tube and said casing and radial extension means on the other of said tube and said casing movable into engagement with said clips when said air lift tube is inserted into said casing.

5. In an air lift diffuser assembly according to claim 4, said radial extension means movable under rotation of said air lift tube into releasable engagement with said clips.

6. An air lift diffuser assembly for aerating a body of water comprising:

a casing extending downwardly through a vertical bore beneath said body of water, said casing including an upper open end and a lower closed end, said upper end terminating substantially at the bottom surface of said body of water, and air supply means extending downwardly through said casing including a source of air under pressure;

a single, straight air lift tube disposed in inner spaced concentric relation to said casing, said air lift tube having an upper end co-terminal with said upper end of said casing and a lower open end, and leg members at said lower open end of said air lift tube extending downwardly at spaced circumferential intervals to rest on said lower closed end of said casing and support said lower open end of said air lift tube in spaced relation to said lower closed end;

a gas diffuser having a fixed, non-rotating bubble-emitting surface including means supporting said gas diffuser in spaced relation to and beneath said lower open end of said air lift tube and means for connecting said air supply means to an underside of said gas diffuser for directing air under pressure through said gas diffuser; and releasable connecting means between upper ends of said air lift tube and said casing for releasably connecting said air lift tube in inner spaced concentric relation to said casing whereby to define an annular space between said tube and said casing having a cross-sectional area greater than that of said tube.

7. An air lift diffuser assembly according to claim 6, said releasable connecting means including complementary locking elements at spaced circumferential intervals between said air lift tube and said casing whereby said lift tube is rotatable into and out of locking engagement with said casing.

8. An air lift diffuser assembly according to claim 6, said leg members diverging downwardly from said lower end of said air lift tube, and spacer blocks interposed between said leg members and said casing.

9. A air lift diffuser assembly according to claim 6, the diameter of said gas diffuser approximately that of said lower end of said air lift tube.

10. An air lift diffuser assembly according to claim 6, including means for supporting said gas diffuser with said bubble-emitting surface spaced from said lower end of said air lift tube a distance on the order of ½ to 1½ times the internal diameter of said lower end of said air lift tube.

11. An air lift diffuser assembly according to claim 6, the space between said bubble-emitting surface and said lower end of said air lift tube being substantially open and free of any obstruction to the passage of bubbles from said gas diffuser upwardly through said air lift tube.

12. An air lift diffuser assembly according to claim 6, said air supply means including a supply line extending vertically between said lower end of said air lift tube and connected to an intake port on said gas diffuser.

13. An air lift diffuser assembly according to claim 6, said lower end of said casing including a bottom plate spaced beneath said gas diffuser, and support means for supporting said gas diffuser in vertically spaced relation to said bottom plate.

* * * * *